United States Patent [19]
Thaler et al.

[11] 3,913,432
[45] Oct. 21, 1975

[54] GAP CUTTING APPARATUS FOR SLIDE FASTENER CHAIN

[75] Inventors: Kurt Thaler; Alfred Neugebauer, both of Stuttgart, Germany

[73] Assignee: Dr.-Ing. Josef Ruhrmann, Stuttgart, Germany

[22] Filed: Sept. 3, 1974

[21] Appl. No.: 502,448

[30] Foreign Application Priority Data
Sept. 7, 1973 Germany............................ 2345204

[52] U.S. Cl. ...................... 83/121; 83/921; 29/33.2; 29/207.5 D
[51] Int. Cl.².................. B26D 7/06; B23P 19/04; A41H 37/06
[58] Field of Search ............. 83/121, 495, 592, 921; 29/33.2, 408, 207.5, 207.5 D

[56] References Cited
UNITED STATES PATENTS
3,391,441 7/1968 Carlile ...................... 29/207.5 D X
3,538,582 11/1970 Perlman ......................... 29/207.5 D
3,848,500 11/1974 Takahashi ......................... 83/921 X Primary Examiner—Willie G. Abercrombie
Attorney, Agent, or Firm—Hans Berman; Kurt Kelman

[57] ABSTRACT

The cutting station of apparatus for cutting gaps in continuous slide fastener chain having plastic filament elements includes a cutting wheel cooperating with a backing wheel. A cutting segment on the cutting wheel has recesses spaced in its circumference and shaped to receive every second locking head of both stringers which jointly form the chain. The segment is received in a matching groove of the backing wheel, thereby shearing off the leg portions associated with the received locking heads and those heads not received in the recesses. The other heads are retained in the rotating cutting wheel while the carrier tapes are separated from the wheel, and are thereby separated from the retained heads.

12 Claims, 11 Drawing Figures

GAP CUTTING APPARATUS FOR SLIDE FASTENER CHAIN

This invention relates to slide fastener machinery, and particularly to apparatus for cutting gaps in the two rows of coupling elements on continuous slide fastener chain, each row consisting of a continuous filament.

Apparatus for this purpose has been disclosed in U.S. Pat. No. 3,538,582 and cuts away every other coupling element, and the separated filament portions remaining on the carriers or tapes are grasped and withdrawn. The known apparatus operates intermittently and thus relatively slowly.

It is an important object of this invention to provide a gap cutting apparatus which combines advantages of the known apparatus over earlier devices with high operating speed.

The basic elements of the gap-cutting apparatus of this invention are a cutting station and a conveying mechanism for continuously and longitudinally moving a fastener chain through the cutting station. The cutting station includes a cutting wheel mounted for rotation about its axis and having a circumferential face portion formed with circumferentially uniformly spaced recesses which are open in a radially outward direction and have each two branches open in opposite axial directions. The cutting station further includes a backing device which introduces a first pair of locking heads of the fastener chain into each recess while introducing filament portions connecting the heads of the first pair with heads of second pairs into the recess branches. The pairs of heads are constituted by associated respective heads of the two rows of coupling or slide fastener elements which engage each other, and the first and second pair of locking heads alternate in the direction of elongation of the slide fastener chain. The backing device cuts the filament portions at the recess branches during movement of the chain through the cutting station, whereby the second pairs of heads are separated from the carriers, and pushed away from the carriers of the two rows by the lands between the recesses in the circumference of the cutting wheel.

Other features, additional objects, and many of the attendant advantages of this invention will readily be appreciated as the same becomes better understood by reference to the following detailed description of a preferred embodiment when considered in connection with the appended drawing in which.

Figure 1:
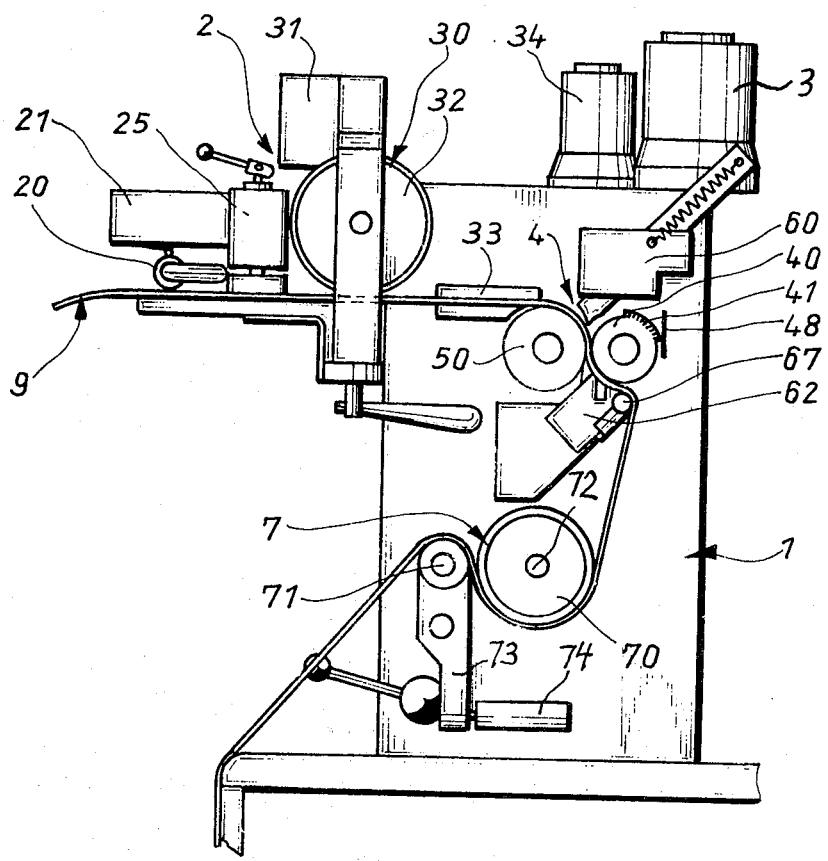
FIG. 1 shows gap cutting or scoop removing apparatus of the invention in side elevation.
Figure 2:
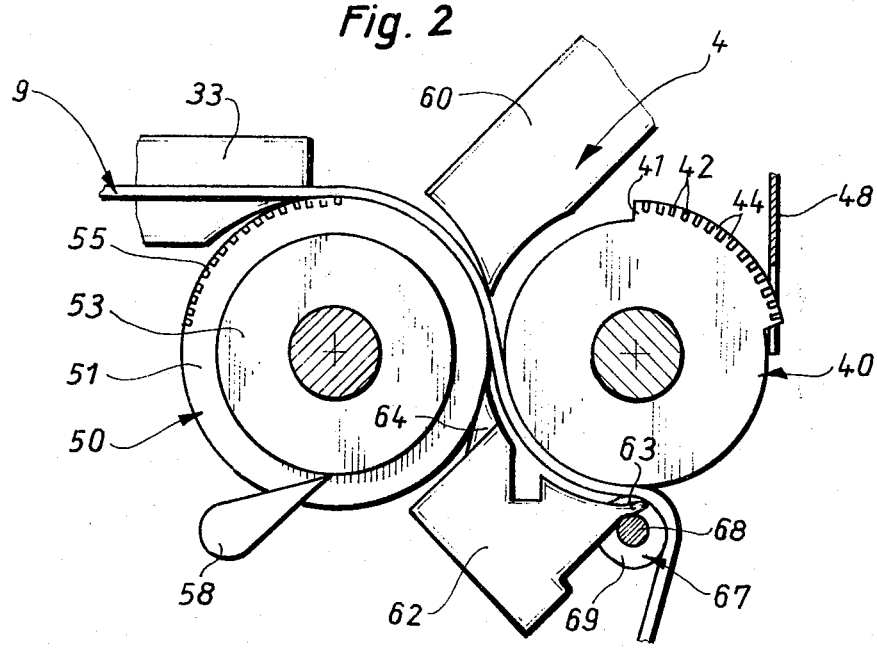
FIGS. 2 to 5 illustrate the cutting station and associated elements of the apparatus of FIG. 1 in respective operating positions and in side-elevational section.
Figure 3:
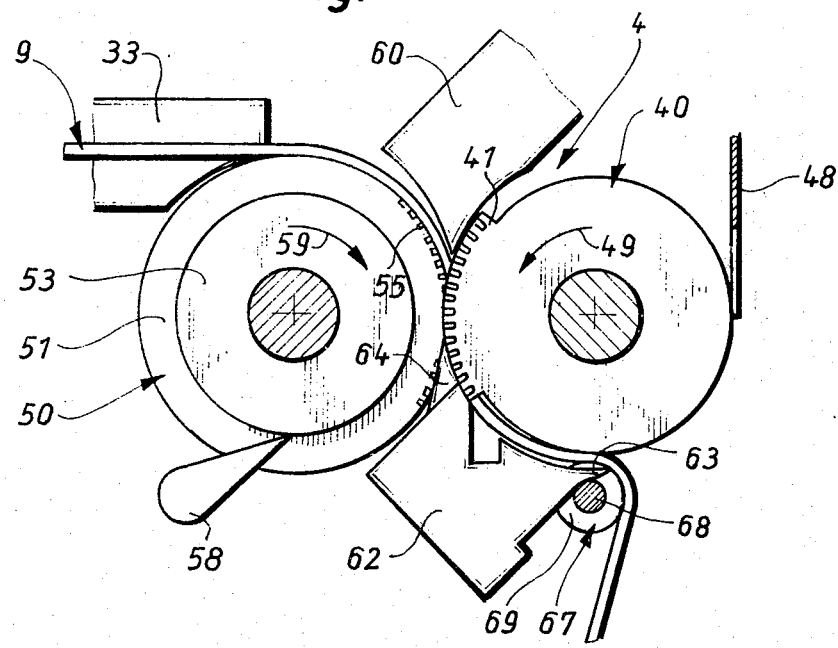
Figure 4:
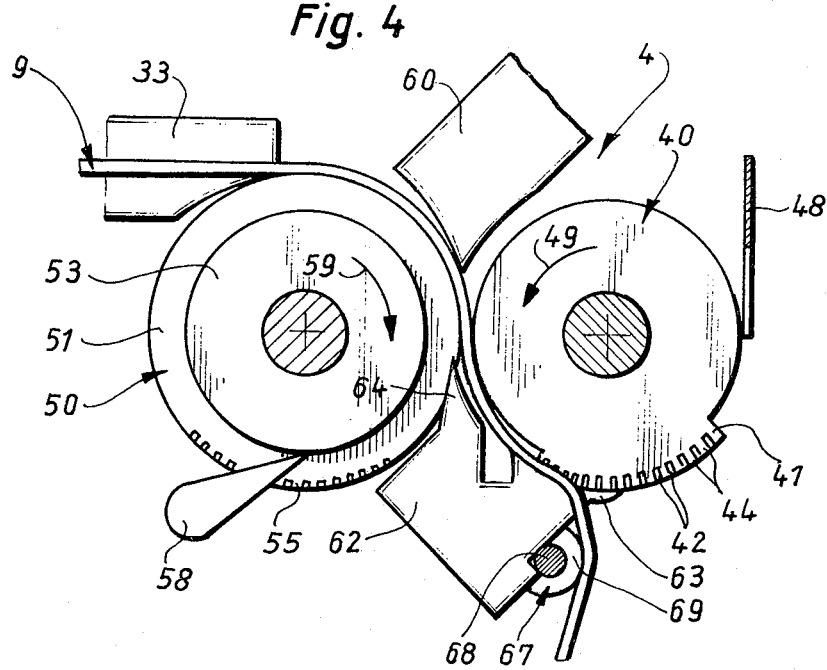

Referring now to the drawing in detail, and initially to FIG. 1, there is shown a gap cutting or scoop removing apparatus whose operating elements are mounted on a base 1 which carries an electric drive motor 3 and encloses motion transmitting linkages connecting the motor 3 to the several operating elements, the drive arrangement being controlled by a control station 2.

At the control station, a roller 20 on the actuating element of a switch 21 scans a moving slide fastener chain 9, and the switch 21 deenergizes the drive motor 3 when the end of the chain passes the roller 20. A manually adjustable brake 25 engages the tape of the chain 9 as it enters the machine and holds the fastener taut in the machine.

The spacing of the gaps to be cut in the continuous chain 9 may be set at a measuring station 30 including a drum 32, conventional in itself and not shown in detail. The drum 32 engages the traveling chain 9 so that the circumference of the drum moves at the speed of the chain. After the drum 32 rotates through an angle that may be set manually, it briefly closes a switch 31 in the energizing circuit of a magnetic clutch 34 in the drive train of a cutting station 4. The clutch is equipped with a holding circuit which deenergizes the clutch after a single revolution of wheels 40,50 at the cutting station of the machine.

A guide 33 feeds the chain 9 in precisely tangential relationship to the wheel 50, hereinafter referred to as the backing wheel. A spring loaded, pivotally mounted guide assembly 60 further maintains contact of the chain 9 with the circumference of the backing wheel 50 until the chain 9 is deflected to the circumference of the cutting wheel 40 by a fixedly mounted second guide assembly 62 which includes a pulley 67 more fully described below. The cutting wheel 40 has a smoothly cylindrical surface over more than three quarters of its circumference, the remainder of the circumference carrying a radially projecting cutting segment 41. A stripper blade 48 is movably mounted on the base 1 and spring biased in a manner not explicitly shown toward the circumference of the wheel 40.

The chain 9 is pulled continuously through the gap cutting apparatus by a discharge unit 7 including a pull roll 70 mounted on an output shaft 72 of the electric motor drive, not otherwise shown, and an idling pressure roll 71 supported by a bracket 73 which is pivotally mounted on the base 1 and biased by a weight 74 to urge the roll 71 toward the pull roll 70 and the gapped fastener passing between the rolls 70, 71.

As is better seen in FIGS. 2 to 6 and 8, the backing wheel 50 consists of three coaxial, axially juxtaposed discs. The two identical outer discs 51, 52 are axially wider and of greater diameter than the central disc 53 so that the wheel 50 has a circumferential groove 54. Notches in slightly less than one quarter of the circumferences of the discs 51,52 separate teeth 55. A stripper blade 58 is pivotally mounted on the base 1 and held in engagement with the circumference of the disc 53 by a non-illustrated spring during rotation of the wheel 50.

The respective shafts of the wheels 40,50 are gear-coupled to each other and to the drive motor in such a manner that they rotate at equal circumferential speeds, identical with the speed of the drive roll 71, in opposite directions indicated by arrows 49,59. The chain 9 passes between the wheels 40,50. The teeth 55 of the wheel 50 and the cutting segment 41 simultaneously engage the scoops of the chain 9 during rotation of the wheels.

Figure 7:
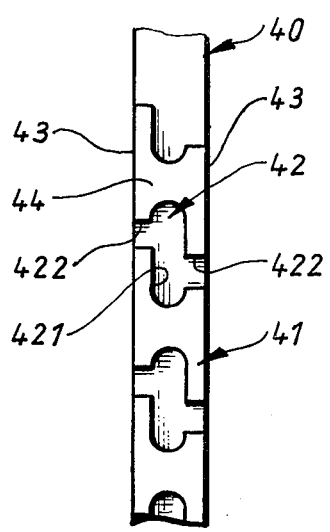
FIG. 7 is a fragmentary top plan view of a cutting wheel in the cutting station.
Figure 8:
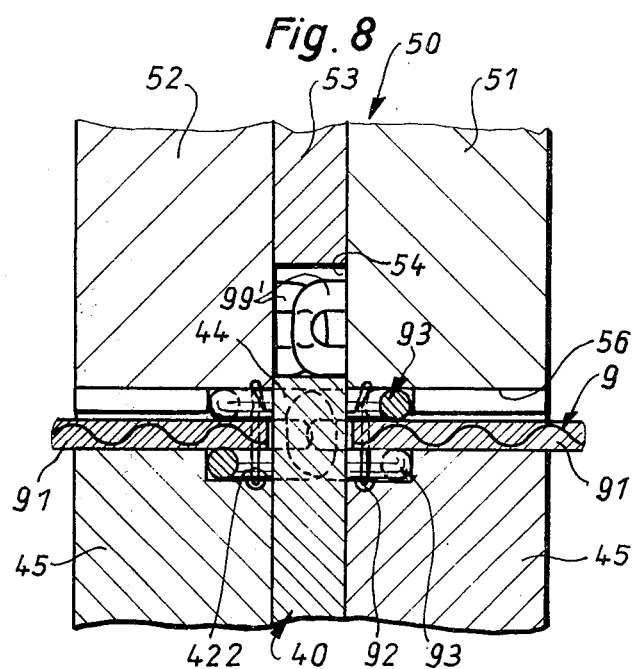
FIG. 8 shows the device of FIG. 6 in section on the line 8 — 8.

As is best seen in FIGS. 7 and 8, the segment 41 has an axially narrow cylindrically curved face formed with circumferentially spaced recesses 42. Each recess has a circumferentially elongated portion 421 from which two circumferentially offset branch portions 422 extend in opposite axial directions through the two circularly arcuate cutting edges 43 of the segment 41, whereby the recesses 42 separate lands 44 of the circumferential segment face. The axial width of the segment 41 is only slightly smaller than the axial spacing of the discs 51,52 for shearing cooperation of the edges 43 with the corresponding edges of the discs as is seen in FIG. 8. The center-to-center spacing of the teeth 55 on the backing wheel 50 is one half of the center-to-center spacing of the recesses 42.

Reverting now to FIGS. 2 to 5, the fixed guide assembly 62 includes a contact finger 63 narrow enough to enter a circumferential groove 69 in the guide pulley 67 which rotates on a shaft 68. The shaft is mounted on the base 1 by means of a lever, obscured by the guide assembly 62, for movement between the positions seen in FIGS. 2, 3, 5 and FIG. 4 respectively, and is normally held in the position shown in FIGS. 2, 3, 5 by an electromagnet, equally obscured, which acts on the arm. A wedge 64 is integral with the main body of the guide assembly 62 and extends from the latter toward the nip of the wheels 40,50.

Figure 9:
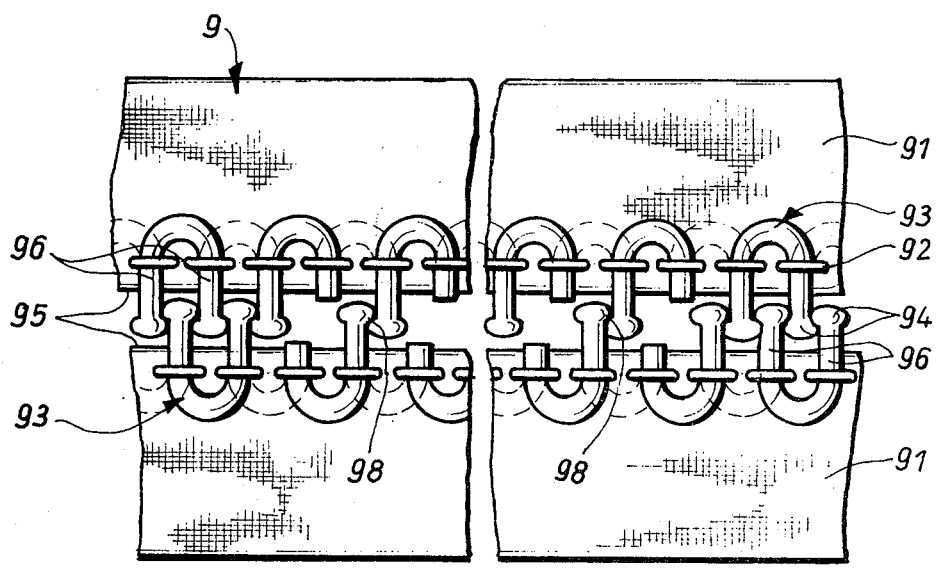
FIG. 9 illustrates a slide fastener chain immediately after cutting of some of its scoops in the apparatus of FIG. 1 in fragmentary top plan view.
Figure 11:
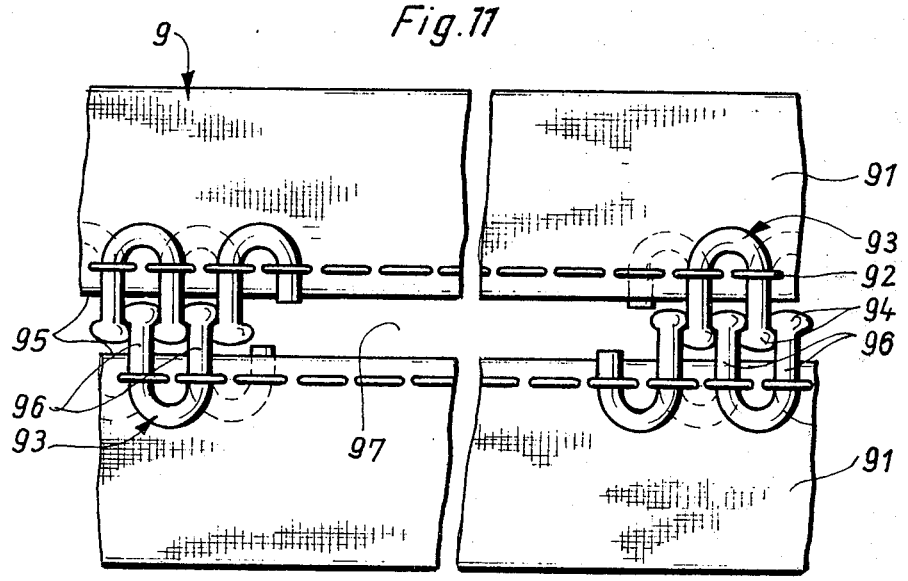
FIG. 11 shows a fastener leaving the machine of FIG. 1 in fragmentary top plan view.

The slide fastener chain 9 in which gaps are to be cut by the apparatus of the invention may be of any type in which the scoops on each of two engaged stringers consist of a continuous length of plastic or metallic filament. The fastener 9 best seen in FIGS. 9 and 11 is of the folded-meander type, but the apparatus of the invention is equally applicable to fastener chain having scoops constituted by respective turns of a suitable deformed spiral filament, nylon or other plastic being the preferred filament material.

The illustrated fastener chain, conventional in itself, has two carrier tapes 91. A row of sewing thread stiches 92 spacedly adjacent an edge 95 of each tape is looped over the leg portions 96 of fastener elements 93. Enlarged portions 94 of the elements constitute locking heads which project beyond the edge 95 of the associated tape 91 toward the edge 95 of the other tape. Each head 94 is associated with an engaged head of the other stringer to form therewith a pair of heads 98.

Figure 6:
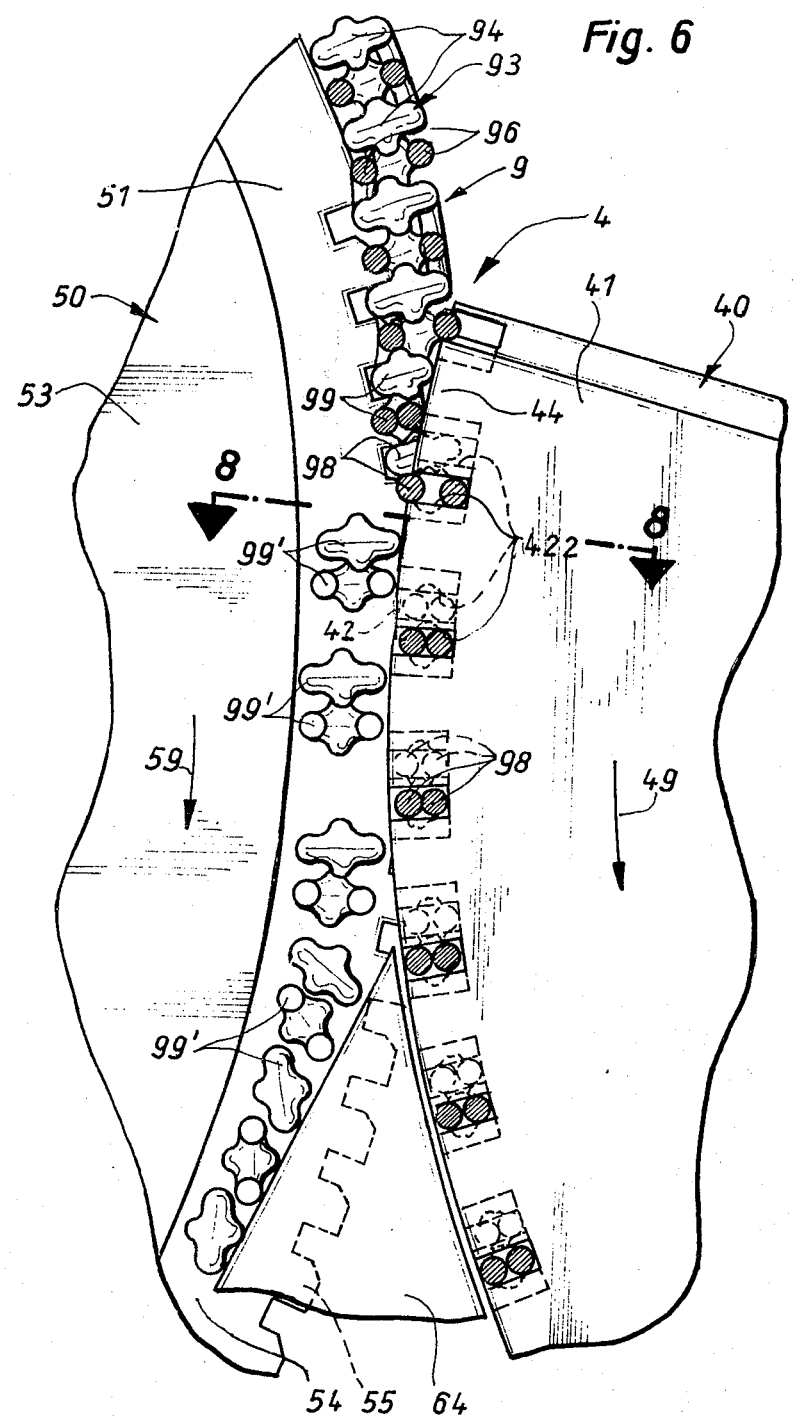
FIG. 6 is an enlarged, fragmentary view of the device of FIG. 3.

The recesses 42 of the cutting wheel 40 are dimensioned and shaped to receive a pair of heads 98 in conforming engagement under some compression. The axial width of the cutting segment 41 and the corresponding width of the groove 54 are somewhat smaller than the spacing of the two tape edges 95, as is best seen in FIGS. 6 and 8. The spacing of the axes of rotation of the wheels 40,50 is such that respective pairs of heads 98 are forced into the recesses 42 by the wheel 50.

As best seen in FIG. 6, the spacing of the notches and teeth 55 in the wheel 50 corresponds to the pitch of the scoops in each of the fastener stringers so that the scoops are presented by the wheel 50 to the cutting segment 41 in precise alignment, the leg portions 96 of the scoops 93 being received in the notches of the wheel 50. The spacing of the recesses 42 in the cutting segment 41 is such that alternating first pairs 98 of heads 94 are received in the recesses, and the leg portions connecting the received pairs 98 from the second pairs remaining outside the recesses and backed by the lands 44 are sheared off by the cutting edges 43. The severed heads 99' of the second pairs are pushed into the groove 54 of the wheel 50 by the lands 44 and by the wedge 64, and are ultimately discharged by the stripper blade 58 from the groove 54 into a waste receptacle (not shown).

Figure 10:
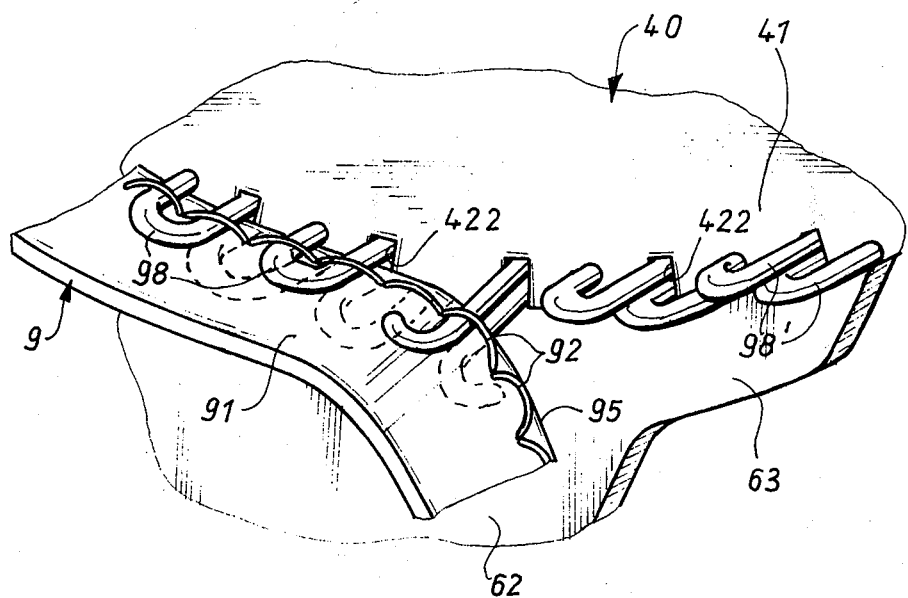
FIG. 10 illustrates elements of the device of FIG. 4 in a perspective view.

The fastener at this stage has the appearance shown in FIG. 9. The scoops 93 in the portions of the tapes 91 intended to be stripped of scoops are cut into short filament sections. When the leading end of the cutting segment 41 reaches the contact finger 63 in a portion of the cutting cycle intermediate those illustrated in FIGS. 3 and 4, a cam, not illustrated, which is mounted on the wheel 40, opens a normally closed switch in the energizing circuit of the electromagnet holding the pulley 67 in the position seen in FIG. 3. The pulley is moved by gravity and by the tension of the fastener chain 9 into its other terminal position seen in FIG. 4 and remote from the wheel 40. The tapes 91 move away from the wheel 40 with the pulley 67 while the stationary contact finger 63 sweeps the circumference of the segment 41, thereby closing the recesses 42 in a radial direction and preventing withdrawal of the severed filament portions from the recesses 42 by the descending tape. As is shown in FIG. 10, the residual leg portions 96 of the isolated filament segments are resiliently deformed, pulled out of the sewing thread loops 92, and thereby separated from the tapes 91.

Figure 5:
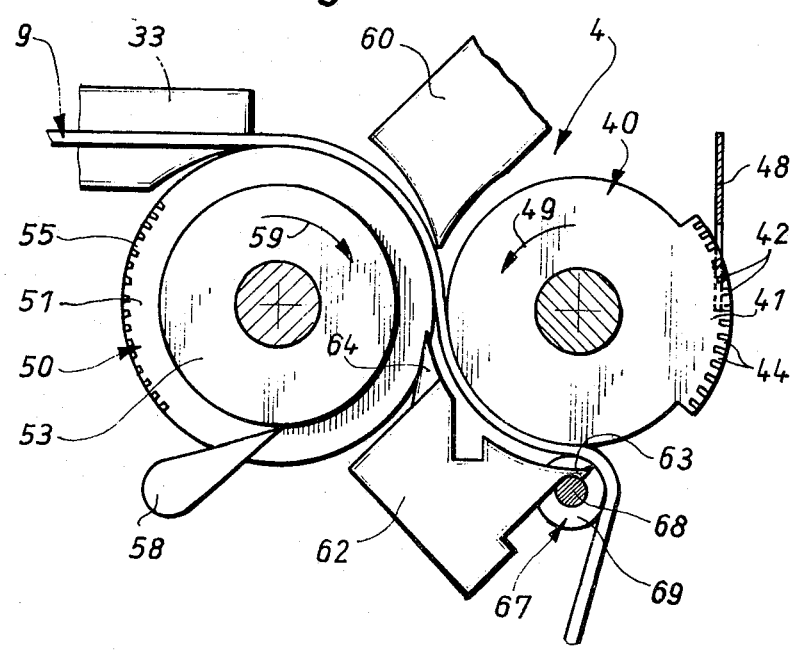

While the segment 41 moves away from the contact finger 63, the non-illustrated switch operating the pulley 67 is again closed, and the pulley is returned to the position shown in FIG. 5. The scoops following the freshly cut gap are protected from injury by the finger 63. The scoop fragments no longer retained in the recesses 42 are discharged from the wheel 40 into a non-illustrated waste receptacle by the blade 48.

The fastener chain discharged from the gap cutting machine is shown in FIG. 11. It has a gap 97 free from scoops whose length is determined by the number of recesses in the wheel 40 and approximately equal to the length of the segment 41. When the tapes 91 thereafter are cut transversely through the gap, individual chains of a desired length, set on the drum 32, are obtained, and have free tape ends.

While a backing wheel has obvious advantages for introducing a first pair of locking heads into each recess portion 421 of the cutting wheel 40 while simultaneously introducing into the recess branches 422 the filament portions connecting the first pair with the locking heads of second pairs, a reciprocating backing device may be employed and its movement suitably synchronized with the single revolution of the cutting wheel 40 during each gap cutting cycle.

The illustrated embodiment of the invention is preferred because it avoids damage to the carrier tapes 91 which travel over the outer discs 51,52, of the backing wheel 50 and thereafter over the guide pulley 67. The scoops or coupling elements also travel over the smooth, cylindrical circumferences of the discs 51,52, while the wheel 50 stands still, and are partly received in the notches between the teeth 55 while the circumference of the wheel 50 travels at the same speed as the fastener chain 9. When the cutting wheel 40 stands still, the scoops or coupling elements travel over the reduced, cylindrical surface portion of the cutting wheel 40 and thereby guide the carrier tapes 91 toward the pulley 67. The pull roll 70 and the pressure roll 71 are grooved in the same manner as the guide pulley 67 so as not to engage the coupling elements.

It should be understood, of course, that the foregoing disclosure relates only to preferred embodiments of the invention, and that it is intended to cover all changes and modifications of the example of the invention herein chosen for the purpose of the disclosure which do not constitute departures from the spirit and scope of the invention set forth in the appended claims.

What is claimed is:

1. Apparatus for cutting a gap in two continuous rows of interlocked slide fastener elements respectively supported on two carriers, said carriers and said elements constituting an elongated slide fastener chain, said rows consisting of respective continuous filaments, each element of each row having an enlarged locking head engaging an associated head of an element of the other row and constituting therewith a pair of associated heads, first pairs of said locking heads alternating with second pairs of said locking heads in the direction of elongation of said slide fastener chain, said apparatus comprising:
    a. a cutting station; and
    b. conveying means for longitudinally moving said chain through said station, said cutting station including
        1. a cutting wheel mounted for rotation about an axis and having a circumferential face portion formed with circumferentially spaced recesses, said recesses defining lands of said face portion therebetween, each recess being open in a radially outward direction and having two branches open in opposite axial directions; and
        2. backing means for introducing a first pair of said locking heads into each of said recesses while introducing portions of said filaments connecting the heads of said first pairs with the heads of said second pairs into said branches, and for cutting said portions during movement of said chain through said station, whereby said second pairs of heads are separated from said carriers.

2. Apparatus as set forth in claim 1, wherein said cutting station further comprises guide means for guiding said chain over said face portion of said cutting wheel during said moving of said chain, and for thereafter separating said carriers from said cutting wheel, said guide means further including retaining means for retaining said first pairs of locking heads in said recesses during said separating of said carriers from said cutting wheel and for thereby separating said first pairs of heads from said carriers.

3. Apparatus as set forth in claim 2, wherein said guide means include a guide member radially closing said recesses.

4. Apparatus as set forth in claim 2, wherein said guide means include a guide pulley guidingly engaging said carriers and movable between two terminal positions adjacent said cutting wheel and remote from said cutting wheel respectively.

5. Apparatus as set forth in claim 2, further comprising stripping means for removing the retained first pairs of locking heads from said recesses after said separating.

6. Apparatus as set forth in claim 1, wherein said backing means include a backing wheel rotatable about an axis parallel to the axis of said cutting wheel and formed with a circumferential groove, said lands being received in said groove during said moving of said chain through said cutting station, whereby said separated second pairs of heads are received in said groove.

7. Apparatus as set forth in claim 6, further comprising stripping means for removing said separated second pairs of heads from said groove.

8. Apparatus as set forth in claim 6, wherein said backing wheel has a circumference formed with uniformly spaced notches defining teeth therebetween, the center-to-center spacing of each notch from an adjacent notch being equal to one half the center-to-center spacing of said recesses in said cutting wheel.

9. Apparatus as set forth in claim 1, wherein said circumferential face portion of said cutting wheel has a greater radius than the remainder of said cutting wheel and constitutes a projecting cutting segment, the apparatus further comprising drive means for continuously driving said conveying means while intermittently rotating said cutting wheel.

10. Apparatus as set forth in claim 9, wherein said drive means include control means responsive to said moving of said chain through said cutting station for intermittently rotating said cutting wheel for one revolution in response to movement of a predetermined length of said chain through said station.

11. Apparatus as set forth in claim 1, wherein said circumferential face portion has two axially spaced cutting edges, said recesses having each a circumferentially elongated portion spaced from said cutting edges, said branches extending from said elongated portion through said cutting edges respectively, the circumferential center-to-center spacing of said recesses being uniform.

12. Apparatus as set forth in claim 11, wherein the branches of each of said recesses are circumferentially offset from each other.

* * * * *